United States Patent [19]
Yamamoto

[11] Patent Number: 4,890,214
[45] Date of Patent: Dec. 26, 1989

[54] START CIRCUIT FOR ADAPTING A CONSTANT CURRENT GENERATOR TO A WIDE VARIETY OF LOADS

[75] Inventor: Hideki Yamamoto, Tokyo, Japan

[73] Assignee: NEC Corporation, Tokyo, Japan

[21] Appl. No.: 196,575

[22] Filed: May 20, 1988

Related U.S. Application Data

[63] Continuation-in-part of Ser. No. 931,094, Nov. 17, 1986, abandoned.

[30] Foreign Application Priority Data

Nov. 15, 1985 [JP] Japan ................ 60-255012

[51] Int. Cl.[4] .......................................... H02M 7/5375
[52] U.S. Cl. ........................................ 363/49; 363/25; 363/97
[58] Field of Search ............... 363/25, 26, 49, 97; 323/281, 283, 901

[56] References Cited

U.S. PATENT DOCUMENTS

| | | | |
|---|---|---|---|
| 3,818,307 | 6/1974 | Hamilton et al. | 363/25 |
| 4,598,351 | 7/1986 | Fair et al. | 363/49 |
| 4,716,359 | 12/1987 | Numata et al. | 323/281 |

FOREIGN PATENT DOCUMENTS

| | | | |
|---|---|---|---|
| 39268 | 3/1983 | Japan | 363/25 |
| 66577 | 4/1983 | Japan | 363/49 |
| 131073 | 7/1985 | Japan | 363/49 |

Primary Examiner—William H. Beha, Jr.
Attorney, Agent, or Firm—Sughrue, Mion, Zinn, Macpeak & Seas

[57] ABSTRACT

A start controlling circuit for delivering a start signal to a constant current generator to cause the latter to supply an output current to a load through which a load current flows. The load current is detected to produce a detection voltage indicative of the load current. A variable control voltage is converted into a first pulse sequence having a repetition period decreasing in response to a rise in the control voltage, and the first pulse sequence is processed into a second pulse sequence having a pulse width which increases in response to such a rise. The second pulse sequence is supplied to the constant current generator as the start signal. An error signal is produced representing the difference between the detection voltage and a gradually rising d.c. reference voltage. The error signal is amplified and applied as the control voltage. The reference voltage is varied when variations in the load result in a change in the load current.

1 Claim, 6 Drawing Sheets

START CIRCUIT FOR ADAPTING A CONSTANT CURRENT GENERATOR TO A WIDE VARIETY OF LOADS

BACKGROUND OF THE INVENTION

This is a continuation-in-part of application Ser. No. 931,094, filed Nov. 17, 1986, now abandoned.

This invention relates to a start controlling circuit for starting a constant current generator, such as a constant current convertor.

A constant current generator is disclosed for example, in U.S. Pat. No. 3,818,307 issued to Billy Harold Hamilton et al. According to Hamilton et al., the constant current generator is controlled by a controlling circuit so as to deliver a constant current output to a load connected to the constant current generator. That is, the constant current generator is kept by the controlling circuit in the steady state of producing the constant current after the generator is started by a start controlling circuit. To this end, the controlling circuit comprises a pulse width modulator. However, the Hamilton et al patent is not directed to the start controlling circuit for the constant generator, although the pulse width modulator is operated in the steady state.

In Japanese Unexamined Patent Prepublication or Kôkai No. 66,577/1983, a start controlling circuit of the type described is disclosed by the present applicant and two other persons. The start controlling circuit supplies a start signal to a constant current generator.

As will later be described with reference to the accompanying drawing, the start controlling circuit disclosed in the above-referenced prepublication is capable of making the constant current generator produce an output current which gradually rises from zero to a constant current. As a rule, such gradual rise may be called a "soft start". Inasmuch as the output current gradually rises from zero when the constant current generator is used, it is possible to supply the output current to a load without surge.

Herein, such a constant current generator may be applied to various kinds of communication systems each of which has a different load and therefore needs a different level of constant current. In this event, the start controlling circuit must be changed so as to be adapted to the various communication systems. Accordingly, various sorts of start controlling circuits must be prepared in order to meet such different demands.

SUMMARY OF THE INVENTION

It is therefore an object of this invention to provide a start controlling circuit for a constant current generator, which circuit is capable of adapting the constant current generator to a wide variety of loads.

Other objects of this invention will become clear as the description proceeds.

A start controlling circuit to which this invention is applicable delivers a start signal to a constant current generator to make the constant current generator supply an output current to a load through which a load current flows in response to the output current, which output current is controlled to reach a constant value. The start controlling circuit includes detecting means for detecting the load current to produce a detection voltage corresponding to the load current, converting means for converting a control voltage variable from zero up to a positive voltage into a first pulse sequence having a pulse repetition period which decreases in response to a rise in the control voltage, processing means responsive to the control voltage for processing the first pulse sequence into a second pulse sequence of a pulse width which increases in response to the control voltage rise, and means for supplying the second pulse sequence to the constant current generator as the start signal. According to this invention, the start controlling circuit comprises reference voltage producing means for producing a d.c. reference voltage gradually rising from zero to a predetermined reference voltage, error amplifying means responsive to the detected voltage and the d.c. reference voltage for amplifying an error signal representative of an error between the detected voltage and the d.c. reference voltage to produce an amplified voltage, and means for supplying the amplified voltage to the converting means and to the processing means as the control voltage.

DESCRIPTION OF THE PREFERRED EMBODIMENTS

Figure 1:
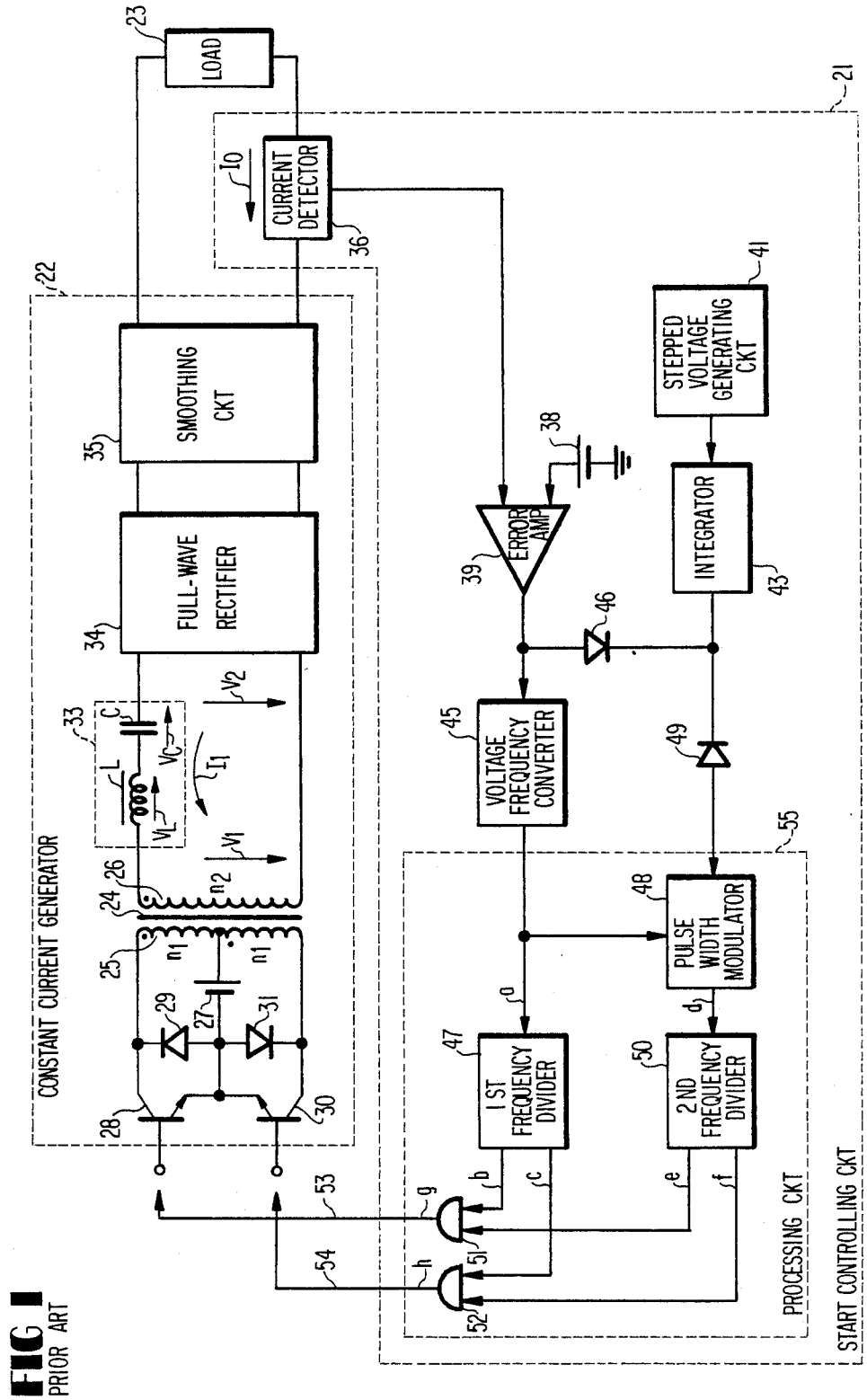
FIG. 1 shows partly in blocks a conventional start controlling circuit together with a constant current generator.

Referring to FIG. 1, a conventional start controlling circuit 21 will be described at first for a better understanding of this invention. The start controlling circuit 21 is substantially equivalent to the conventional circuit disclosed in the Japanese Patent Prepublication referred to hereinabove. The start controlling circuit 21 delivers a start signal to a constant current generator 22 to make the constant current generator 22 supply an output current $I_0$ to a load 23.

The constant current generator 22 is a series resonance converter of the so-called push-pull type and comprises an inverter transformer 24 having a primary winding 25 and a secondary winding 26. The primary winding 25 has a center tap and a first and second partial primary windings divided in relation to the center tap. A d.c. voltage source 27 has a positive terminal connected to the center tap. A first switching transistor 28 has a collector electrode connected to an end terminal of the primary winding 25 and an emitter electrode connected to a negative terminal of the d.c. voltage source 27. A diode 29 is connected between the collector and the emitter electrodes of the first switching transistor 28 to commutate a current flowing through the transistors 28 and 30. Likewise a second switching transistor 30 and another diode 31 are connected between another end terminal of the primary winding 25 and the negative terminal of the d.c. voltage source 27.

In the manner which will later be described first and second partial start signals are supplied to base electrodes of the first and the second switching transistors 28 and 30, respectively. Responsive to the first and the second partial start signals, the first and the second switching transistors 28 and 30 alternately turn on and off. In other words, the transistors 28 and 30 carry out the push-pull operation to produce an a.c. voltage $V_1$ through the inverter transformer 24. A combination of the first and the second switching transistors 28 and 30, the inverter transformer 24, the d.c. voltage source 27, and the diodes 29 and 31 is operable as an inverter for converting a source voltage of the d.c. voltage source 27 into the a.c. voltage $V_1$.

A series resonance circuit 33 comprises an inductor L and a capacitor C connected in series. The series resonance circuit 33 has an end connected to an end terminal of the secondary winding 26. A full-wave rectifier 34 is connected between another end of the series resonance circuit 33 and another end terminal of the secondary winding 26 and carries out full-wave rectification of an output signal of the series resonance circuit 33 to produce a rectified signal. A smoothing circuit 35 smooths the rectified signal into a smoothed d.c. signal which is delivered to the load 23 as the output current $I_0$ described before. The output current $I_0$ is caused to flow through the load 23 as a load current.

The start controlling circuit 21 comprises a current detector 36 for detecting the load current to produce a detection voltage which corresponds to the load current. A reference voltage source 38 produces a constant d.c. reference voltage. Responsive to the detection voltage and the constant d.c. reference voltage, an error amplifier 39 amplifies an error signal representative of an error or a difference between the detection voltage and the constant d.c. reference voltage. An amplified error signal is produced as an amplified voltage from the error amplifier 39.

A step voltage generating circuit 41 generates a voltage which is varied stepwise from zero to a prescribed voltage. Responsive to the stepped voltage, an integrator 43 integrates the stepped voltage to produce an integrated voltage which gradually rises from zero toward a positive voltage. The integrated voltage will be called a control voltage as the case may be.

A voltage-to-frequency converter 45 is connected to the error amplifier 39 directly and connected to the integrator 43 through a diode 46. The converter 45 is supplied with a converter input voltage defined by cooperation of the amplified voltage and the control voltage. The converter input voltage is determined by the control voltage when the control voltage is not higher than the amplified voltage. Otherwise, the converter input voltage is determined by the amplified voltage. The voltage-to-frequency converter 45 is operable as a converting circuit for converting each of the control voltage and the amplified voltage to a first pulse sequence having a pulse repetition period which decreases in response to a rise of each of the control voltage and the amplified voltage. In other words, the first pulse sequence has a pulse repetition frequency which increases in response to the rise of the converter input voltage.

A first frequency divider 47 has a dividing factor of two. Responsive to the first pulse sequence, the first frequency divider 47 divides the pulse repetition frequency of the first pulse sequence into a first divided pulse sequence and a second divided pulse sequence which has opposite phase relative to the first divided pulse sequence. Each of the first and the second divided pulse sequences has the same divided pulse repetition period which is equal to twice the pulse repetition period of the first pulse sequence.

The integrated or control voltage is supplied to a pulse width modulator 48 through another diode 49. Responsive to the first pulse sequence and the control voltage supplied through the diode 49, the pulse width modulator 48 produces a modulated pulse sequence of a pulse width which increases in response to a rise of the control voltage. The modulated pulse sequence has leading edges which are in synchronism with trailing edges of the first pulse sequence.

A second frequency divider 50 has also a dividing factor of two. Responsive to the modulated pulse sequence, the second frequency divider 50 produces third and fourth divided pulse sequences like the first frequency divider 47. The third divided pulse sequence is of opposite phase relative to the fourth divided pulse sequence, as mentioned before. The phase differenced between the third and the fourth divided pulse sequences is equal to 180°.

Operation of the first and the second frequency dividers 47 and 50 and the pulse width modulator 48 will presently be described more in detail.

Responsive to the first and the third divided pulse sequences, a first AND circuit 51 produces a first AND pulse sequence. Likewise a second AND circuit 52 produces a second AND pulse sequence in response to the second and the fourth divided pulse sequences.

Through first and second signal supply lines 53 and 54, the first and the second AND pulse sequences are sent to the first and the second switching transistors 28 and 30 as the first and the second partial start signals, respectively.

Figure 2:
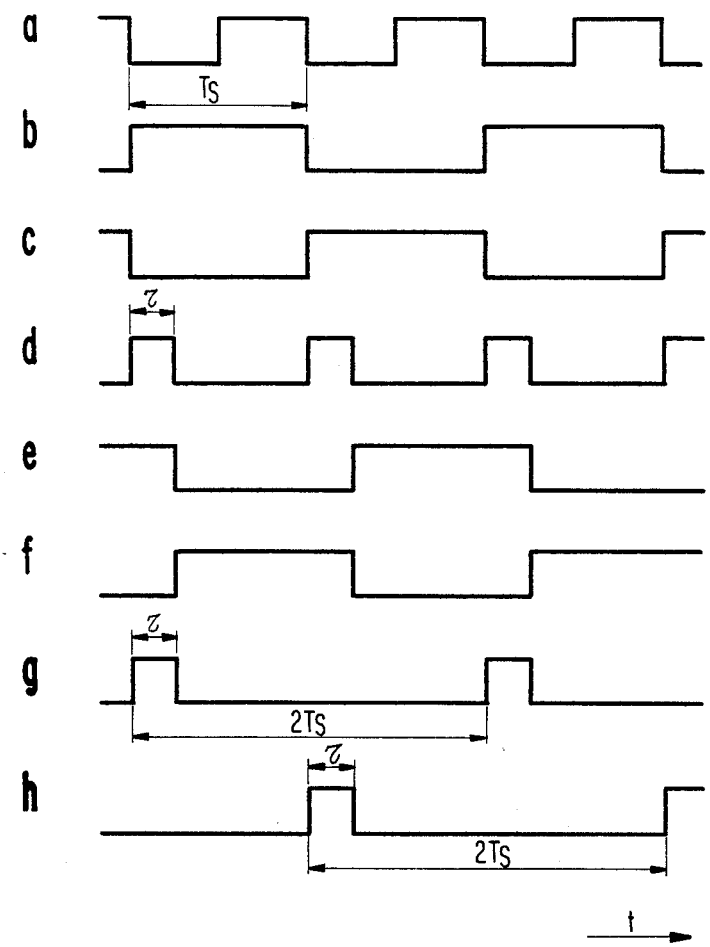
FIG. 2 is a time chart for use in describing the operation of a start controlling circuit in general.

Referring to FIG. 2 together with FIG. 1, description will now be made as regards operation of the start controlling circuit 21. When the stepped voltage is generated by the step voltage generating circuit 41, the integrator 43 produces the integrated voltage, namely, the control voltage. As described above, the control voltage gradually rises from zero toward a positive voltage. The control voltage is applied to the voltage-to-frequency converter 45 and to the pulse width modulator 48 through the diodes 46 and 49, respectively, in the manner described above.

In a normal or steady state except for the initial state, an amplified voltage of the error amplifier 39 decreases when the detection voltage becomes higher than the constant d.c. reference voltage of the reference voltage source 38. When the detection voltage becomes lower than the constant d.c. reference voltage, the amplified voltage increases.

Herein, let the initial state be considered wherein the constant current generator 22 is started by the start controlling circuit 21. In this event, the load current is weaker than the constant current and the detection voltage is therefore lower than the constant d.c. reference voltage. The resultant amplified voltage inevitably becomes higher than the control voltage immediately after the constant current generator 22 is started. As a result, the control voltage is given to the voltage-to-frequency converter 45 through the diode 46, rather than the amplified voltage. The other diode 49 operates like the diode 46 and makes the pulse width modulator 48 cooperate with the control voltage.

The voltage-to-frequency converter 45 converts the control voltage to the first pulse sequence of pulse repetition period $T_S$ which decreases in response to a rise in the control signal, as shown at a in FIG. 2.

Responsive to the first pulse sequence a, the first frequency divider 47 of dividing factor "2" delivers first and second divided pulse sequences to the first and the second AND circuits 51 an 52, respectively. In FIG. 2, the first and the second divided pulse sequences are of opposite phase relative to each other, as depicted at b and c.

Responsive to the first pulse sequence a and the control voltage, the pulse width modulator 48 produces the modulated pulse sequence as indicated at d in FIG. 2. The modulated pulse sequence d has a pulse width $\tau$ which increases with the rise of the control voltage. The pulse width $\tau$ is shorter than the pulse repetition period $T_S$ of the first pulse sequence a.

The second frequency divider 50 of dividing factor "2" is supplied with the modulated pulse sequence d to deliver the third and the fourth divided pulse sequences to the first and the second AND circuits 51 and 52, as shown at e and f in FIG. 2, respectively. As is apparent from FIG. 2, the phase difference between the third and the fourth divided pulse sequences is equal to 180°.

Responsive to the first and the third divided pulse sequences b and e, the first AND circuit 51 delivers the first AND pulse sequence to the first switching transistor 28 through a first signal supply line 53 as the first partial start signal described earlier. The first AND pulse sequence is indicated at g in FIG. 2. Responsive to the second and the fourth divided pulse sequences c and f, the second AND circuit 52 delivers the second AND pulse sequence to the second switching transistor 30 through a second signal supply line 54 as the second partial start signal described before. The second AND pulse sequence is indicated at h in FIG. 2. Each of the first and the second AND pulse sequences g and h has a pulse repetition period $2T_S$ and a pulse width $\tau$.

Inasmuch as a combination of the first and the second AND pulse sequences g and h is supplied to the constant current generator 22 as the start signal, the combination is referred to herein as a second pulse sequence. It should be understood that the second pulse sequence has a pulse repetition period $T_S$ and a pulse width $\tau$ in the example illustrated in FIG. 2.

The combination of the first and the second frequency dividers 47 and 50, the pulse width modulator 48, and the first and the second AND circuits 51 and 52 is referred to as a processing circuit 55 which is responsive to the control voltage to process the first pulse sequence into the second pulse sequence of a pulse width which increases in response to the rise of the control voltage.

The combination of the first and the second signal supply lines 53 and 54 is operable as a signal supply means for supplying the second pulse sequence to the constant current generator 22 as the start signal.

As described in the preamble of the instant specification, the start controlling circuit 21 is capable of making the constant current generator 22 supply the load 23 with output current $I_0$ which gradually rises from zero to a constant current.

Figure 3:
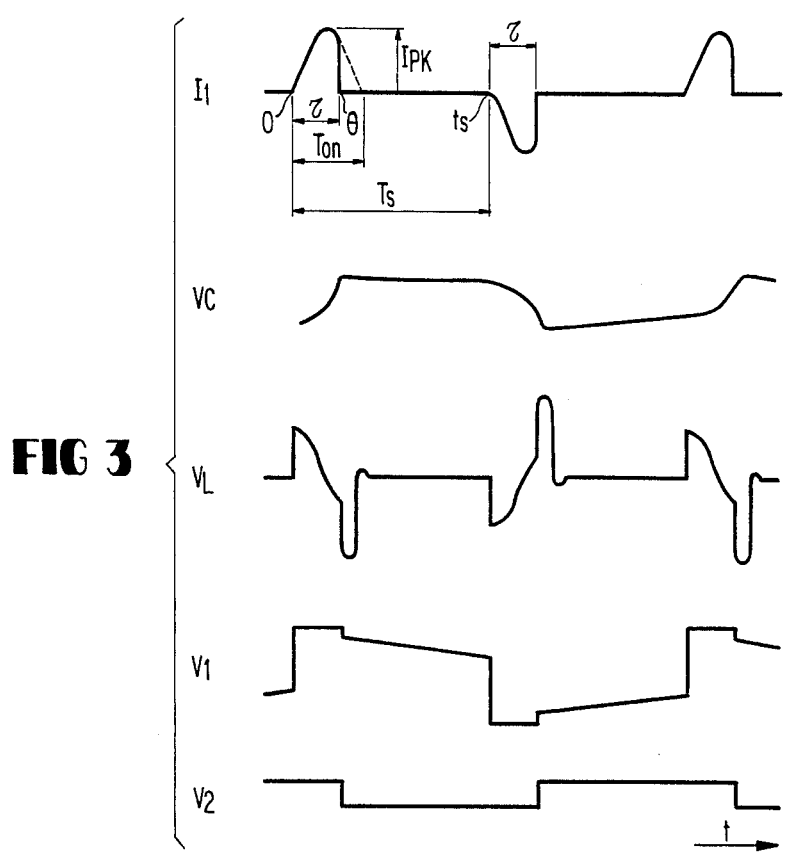
FIG. 3 is another time chart for use in describing the operation of the start controlling circuit mentioned in conjunction with FIG. 2.

Referring to FIG. 3 together with FIGS. 1 and 2, the reason why the start controlling circuit 21 can make the generator 22 supply the load 23 with an output current $I_0$ which gradually rises from zero toward the constant current will be explained.

As mentioned above, each of the first and the second partial start signals g and h has a pulse repetition. The pulse repetition period $2T_S$ and the pulse width $\tau$ period $2T_S$ and the pulse width $\tau$ are defined by the control voltage immediately after the generator 22 is started.

In FIG. 3, signal wave forms at various parts of the constant current generator 22 are illustrated along a time axis t. It will be assumed that in the manner depicted along the first or the top line the first switching transistor 28 turns on (upwards) at a time instant $5 = 0$ and is kept in an on state during a time interval which is equal to the pulse width $\tau$ of the first partial start signal. The first switching transistor 28 turns off at another time instant $t = \theta$ ($\theta < \pi$). The first switching transistor 28 repeatedly turns on with a period which is equal to the pulse repetition period $2T_S$ of the first partial start signal. It will also be assumed that the second switching transistor 30 turns on (downwards) at a time instant $t = t_S$ and is kept in an on state during a time interval which is equal to the pulse width $\tau$ of the second partial start signal. The second switching transistor 30 is repeatedly put in the on state at a period equal to the pulse repetition period $2T_S$ of the second partial start signal. As is apparent from the above, the second switching transistor 30 turns on when a time duration $T_S$ lapses after the first switching transistor 28 turns on.

Herein, let the series resonance circuit 33 have a resonant period $2T_{on}$. In this case, $T_{on}$ represents half of the resonance period and is represented by:

$$T_{on} = \pi/\omega,$$

where $\omega$ represents the angular frequency of the resonant current of the series resonance circuit 33.

During the on state of the first switching transistor 28, namely, during the time instant from $t = 0$ to $t = \theta$, the resonant current $I_1$ flows through the resonant circuit 33 as depicted along the top line. The aforementioned capacitor C of the series resonance circuit 33 is charged in response to the resonant current $I_1$. As a result, a voltage $V_C$ appears across the capacitor C and is variable as depicted along the second line from the top. A voltage $V_L$ appears across the inductor L and varies as depicted along the third line. On the other hand, an output voltage $V_1$ is developed between both end terminals of the secondary winding 26 and is kept constant during a time duration defined by $0 \leq t \leq \theta$ as depicted along the fifth or the bottom line.

The voltage $V_C$ is represented by Equation (1) hereinunder:

$$V_C = \frac{1}{C} \int_0^\theta I_1 dt = \frac{1}{C} \int_0^\theta I_{pk} \sin \omega t \qquad (1)$$

$$= \frac{I_{pk}}{c\pi} (1 - \cos \omega \tau) \cdot T_{on}$$

where $I_{pk}$ represents a maximum value of the resonant current $I_1$. As is apparent from Equation (1), it is possible to reduce the voltage $V_C$ by reducing the pulse width $\tau$.

It is to be noted that a magnetic flux appears in the inverter transformer 24 and varies in accordance with the on and off states of the first and the second switching transistors 28 and 30. During the time duration designated by $0 \leq t \leq \theta$, the magnetic flux is subjected to a variation $\phi_1$ which is represented by:

$$\phi_1 = \frac{1}{n_1} \int_0^\theta V_{in} dt = \frac{V_{in}}{n_1} \cdot \tau. \quad (2)$$

where $n_1$ represents the number of turns of each of the partial primary windings of the primary winding 25 while $V_{in}$ represents the source voltage of the d.c. voltage source 27.

When the first switching transistor 28 turns off at the time instant $t=\theta$, the capacitor C discharges through the full-wave rectifier 34, the smoothing circuit 35, the secondary winding 26, and the inductor L during a time duration of $\theta \leq t \leq t_S$. As a result, a voltage difference ($V_C - V_2$) appears between end terminals of the secondary winding 26. Assuming that $\phi_2$ represents a variation of the magnetic flux in the inverter transformer 24 during the time duration of $\theta \leq t \leq t_S$, the variation $\phi_2$ is represented by:

$$\begin{aligned} \phi_2 &= \frac{1}{n_2} \int_\theta^{t_S} (V_C - V_2) dt \\ &= \frac{1}{n_2} (V_C - V_2) \cdot (T_S - \tau), \end{aligned} \quad (3)$$

where $n_2$ represents the number of turns of the secondary winding 26.

Assuming that $\phi$ represents the entire variation of the magnetic flux in the inverter transformer 24 during the time duration of $0 \leq t \leq t_S$, namely, during $T_S$, the entire variation $\phi$ is represented by:

$$\phi = \phi_1 + \phi_2 = \frac{V_{in}}{n_1} \cdot \epsilon + \frac{1}{n_2} (V_C - V_2) \cdot (T_S - \tau). \quad (4)$$

The voltage $V_1$ across both end terminals of the secondary winding 26, is represented by:

$$V_{in} \cdot \frac{n_2}{n_1} = V_1 \approx V_C - V_2 \quad (5)$$

That is, the voltage $V_1$ is approximately equal to a constant value throughout the time duration of $T_S$ as is apparent from the fourth line of FIG. 3. From this viewpoint, the entire variation $\phi$ is represented by:

$$\phi = \frac{V_C - V_2}{n_2} \cdot T_S \quad (6)$$

The output current $I_0$ of the generator 22 is represented by:

$$I_O = \frac{1}{T_S} \int_0^\theta I_1 dt = \frac{2}{\pi} \cdot \frac{\tau}{T_S} \cdot I_{pk} \quad (7)$$

In Equation (7), let the pulse repetition period $T_S$ initially become extremely long and thereafter become short with the pulse width $\tau$ and the maximum current $I_{pk}$ kept constant. Under these circumstances, it may be possible to make the output current $I_0$ gradually increase from zero toward the constant current. However, there is a limit in lengthening the pulse repetition period $T_S$. Such a long pulse repetition period $T_S$ gives rise to an extreme increase in the entire variation $\phi$. Operation of the inverter becomes unstable when the variation $\phi$ reaches a saturation magnetic flux $\phi_S$ in the inverter transformer 24. It is therefore impossible to make the generator 22 supply the load 23 with an output current $I_0$ which gradually rises from zero. The resultant output current $I_0$ suddenly rises from zero and therefore the load 23 is supplied with a surge.

Even if the start controlling circuit 21 could make the current generator 22 produce an output current $I_0$ which gradually rises from zero (that is, $V_2 \approx 0$) soon after start of the constant current generator 22, saturation of the inverter transformer 24 can be avoided if a condition is selected such that the variation $\phi$ is less than the saturation magnetic flux $\phi_S$ soon after the start of the constant current generator 22 as follows:

$$\phi = \frac{V_C}{n_2} \cdot T_S < \phi_S \quad (8)$$

In order to satisfy the condition given by Inequality (8), the voltage $V_C$ must be lowered. This can be achieved by making the pulse width $\tau$ narrow as is readily understood from Equation (1). To this end, the processing circuit 55 processes the first pulse sequence into the second pulse sequence of pulse width $\tau$ which increases in response to a rise in the control voltage.

Figure 4:
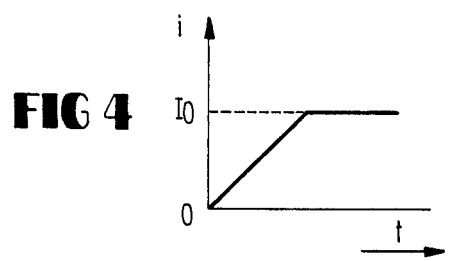
FIG. 4 shows an output current of the constant current generator on starting the generator when using the start controlling circuit of the type described above.

Referring to FIG. 4, the output current $I_0$ gradually rises from zero to the constant current through the use of the start controlling circuit 21, as depicted in FIG. 4, when the condition is satisfied.

However, the start controlling circuit 21 is incapable of adapting the current generator 22 to a wide variety of loads. This is because the reference voltage source 38, the step voltage generating circuit 41, and the integrator 43 must inevitably be changed when the load 23 is changed. In addition, it is difficult to keep the output current $I_0$ stable in the initial state. The reason for this difficulty will now be described. The error amplifier 39 is used in a feedback loop for the constant current generator 22. Inasmuch as the integrator 43 is connected to the output side of the error amplifier 39, the integrator 43 is not included in the feedback loop. Immediately after the generator 22 is started by the start controlling circuit 21, the converting circuit 45 and the processing circuit 55 are not controlled by the output voltage of the amplifier 39 but by the control voltage produced by the integrator 43 independently of the constant reference voltage of the reference voltage source 38. Inasmuch as the control voltage is supplied to the converting circuit 45 and the processing circuit 55 independently of the constant reference voltage, the output current $I_0$ is unstable. It is therefore difficult to select a comparatively low (nearer to zero) output current $I_0$ as the constant current. This is the reason for the difficulty.

Figure 5:
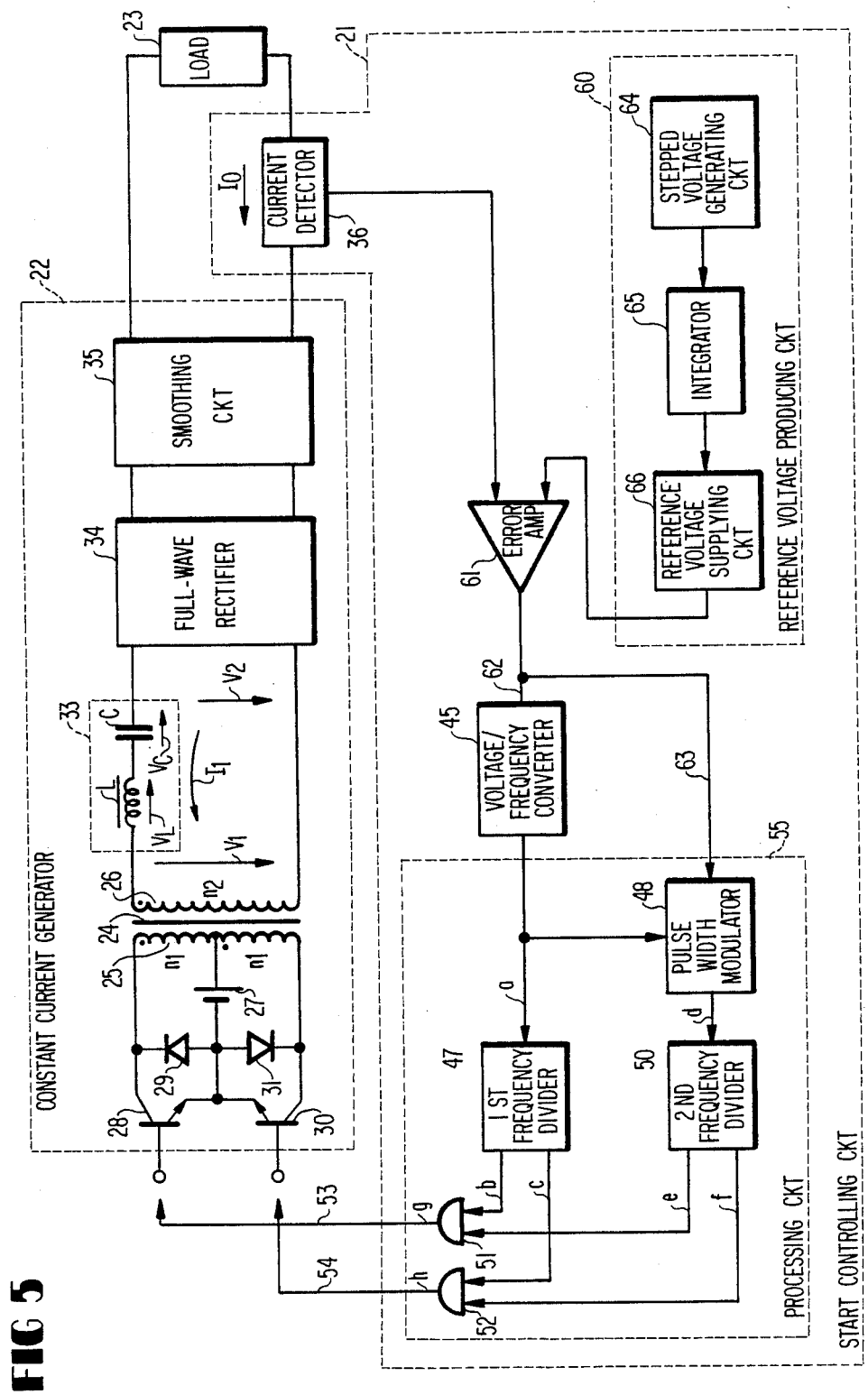
FIG. 5 shows partly in blocks a start controlling circuit according to an embodiment of this invention together with a constant current generator.

Referring now to FIG. 5, the start controlling circuit 21 according to an embodiment of this invention comprises similar parts designated by like reference numerals. The start controlling circuit 21 comprises a reference voltage producing circuit 60 for producing a d.c. reference voltage which gradually rises from zero toward a predetermined reference voltage, to be finally kept at the predetermined reference voltage. Responsive to the detected voltage and the d.c. reference voltage, an error amplifier 61 amplifies an error signal representative of an error between the detected voltage and the d.c. reference voltage to produce an amplified voltage. A voltage supply line 62 supplies the amplified voltage to the voltage-to-frequency converter, namely, the converting circuit 45, as the control voltage. Another voltage supply line 63 supplies the amplified voltage to the pulse width modulator 48 of the processing circuit 55 as the control voltage.

The reference voltage producing circuit 60 comprises a step voltage generating circuit 64 for generating a stepped voltage which substantially momentarily rises from zero towards a preselected voltage. Responsive to the step voltage, an integrator 65 integrates the step voltage to produce an integrated voltage which gradually rises from zero toward a positive voltage.

Responsive to the integrated voltage, a reference voltage supplying circuit 66 shapes the integrated voltage into the d.c. reference voltage. Thus, the combination of the integrator 65 and the reference voltage supplying circuit 66 is operable as a shaping circuit for shaping the step voltage into the d.c. reference voltage.

Description will now be made as regards the operation of the starting controlling circuit 21 depicted in FIG. 5. When the step voltage is generated by the step voltage generating circuit 64, the integrator 65 produces an integrated voltage which gradually rises from zero. Responsive to the integrated voltage, the reference voltage supplying circuit 66 supplies the d.c. reference voltage to the error amplifier 61. Inasmuch as the error amplifier 61 has a feedback operation, the error amplifier 61 supplies the voltage-to-frequency converter or the converting circuit 45 and the pulse width modulator 48 with an amplified voltage which increases in proportion to an increase in the d.c. reference voltage. As a result, the start controlling circuit 21 is capable of making the generator 22 produce, like the start controlling circuit 21 illustrated in FIG. 1, an output current $I_0$ which gradually rises from zero.

In addition, the d.c. reference voltage gradually rises from zero to the predetermined reference voltage and is applied to the error amplifier 61. As a result, the converting circuit 45 and the processing circuit 55 are controlled by the amplified voltage. The start controlling circuit 21 is therefore capable of making the generator 22 produce a stable output current $I_0$ immediately after the generator 22 is started by the start controlling circuit 21. As a result, it is possible to select the constant current value even at a comparatively low current nearer to zero. Thus, the start controlling circuit 21 of FIG. 5 is capable of adapting the current generator 22 to a wide variety of loads.

Figure 6:
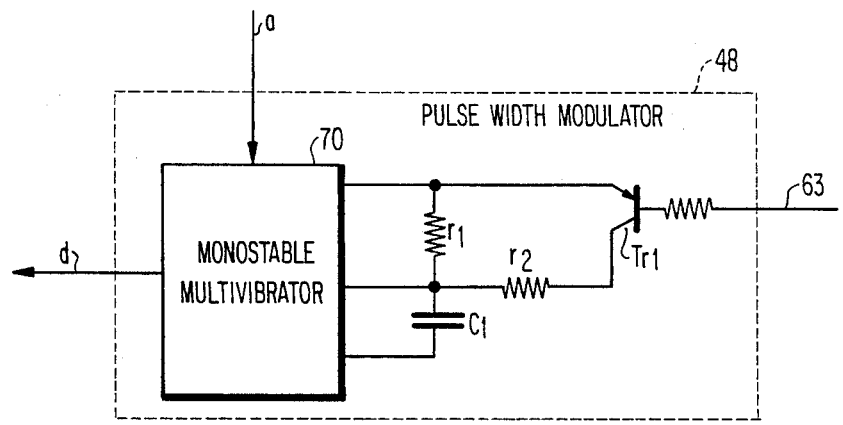
FIG. 6 shows a pulse width modulator which can be used in the start controlling circuit illustrated in FIG. 5.

Referring to FIG. 6, the pulse width modulator 48 may comprise a monostable multivibrator 70. The monostable multivibrator 70 has a time constant circuit which comprises a transistor $Tr_1$, resistors $r_1$ and $r_2$, and a capacitor $C_1$. The transistor $Tr_1$ has a base electrode connected to the voltage supply line 63. The transistor $Tr_1$ is operable as a variable resistor which has a resistance variable in response to the amplified voltage supplied through the voltage supply line 63. Responsive to the first pulse sequence indicated at a in FIG. 2 the monostable multivibrator 670 produces the modulated pulse sequence which is indicated at d in FIG. 2. The modified pulse sequence d has leading edges which are coincident with trailing edges of the first pulse width $\tau$ increases with a rise in the amplified voltage. That is, the pulse width $\tau$ is defined by a time constant of the time constant circuit. The time constant is defined by cooperation of the resistance of the transistor $Tr_1$, resistances of the resistors $r_1$ and $r_2$, and a capacitance of the capacitor $C_1$.

Figure 7:
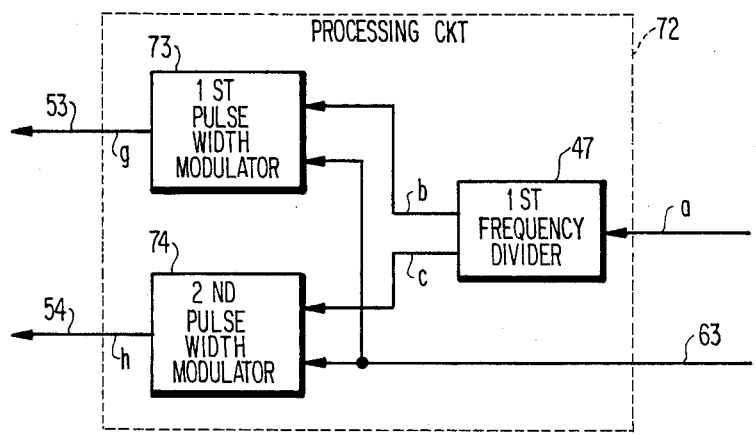
FIG. 7 is a block diagram of a processing circuit which may be used in the start controlling circuit depicted in FIG. 5.

Referring to FIG. 7, another processing circuit 72 can replace the processing circuit which is described in conjunction with FIG. 1 and is used in the start controlling circuit depicted in FIG. 5. The processing circuit 72 comprises first and second pulse width modulators 73 and 74 instead of the pulse width modulator 48, the second frequency divider 50, and the AND circuits 51 and 52 of the processing circuit 55.

As mentioned before, the first frequency divider 47 produces first and second divided pulse sequences which are indicated at b and c in FIG. 2.

Responsive to the first divided pulse sequence b and the amplified voltage supplied through the voltage supply line 63, the first pulse width modulator 73 produces a first modulated pulse sequence. The first modulated pulse sequence has leading edges which are coincident with trailing edges of the first divided pulse sequence b. The first modulated pulse sequence has a pulse width $\tau$ which increases with a rise in the amplified voltage. The first modulated pulse sequence can therefore be used as the first AND pulse sequence indicated at h in FIG. 2.

The first and the second modulated pulse sequences are supplied to the first and the second switching transistors 28 and 30 through the first and the second signal supply lines 53 and 54, respectively.

Figure 8:
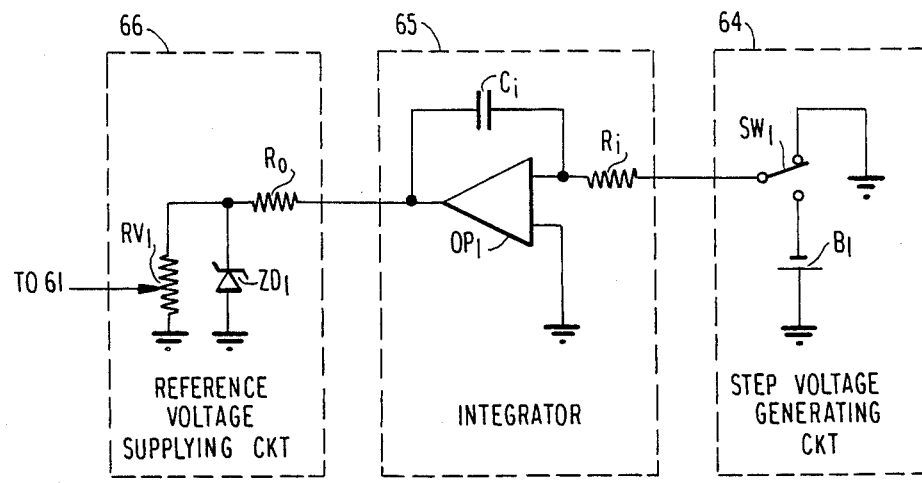
FIG. 8 shows a reference voltage producing circuit which can be used in the start controlling circuit illustrated in FIG. 5.

Referring to FIG. 8, the step voltage generating circuit 64 comprises a switch $SW_1$ and a battery $B_1$ having a first or negative electrode and a second or positive electrode which is connected to ground. The switch $SW_1$ has a first and a second switch input terminals and a switch output terminal which is connected to the integrator 65. The first switch input terminal is connected to ground while the second switch input terminal is connected to the first or negative electrode of the battery $B_1$. When the start controlling circuit 21 (FIG. 5) is not operating the switch $SW_1$ connects between ground and the integrator 65 as illustrated in FIG. 8. When the switch $SW_1$ is operated so as to connect the first electrode and the integrator 65, the combination of the switch $SW_1$ and the battery $B_1$ supplies the integrator 65 with a step voltage which substantially instantaneously rises from zero toward the preselected (battery) voltage.

The integrator 65 comprises an operational amplifier $OP_1$ and a time constant circuit which comprises a resistor $R_i$ and a capacitor $D_i$ and is coupled to the operational amplifier $OP_1$. More specifically, the operational amplifier $OP_1$ has first and second amplifier input terminals and an amplifier output terminal which is connected to the reference voltage supplying circuit 66. The first amplifier input terminal is connected through the resistor $R_i$ to the switch output terminal of the switch $SW_1$. Between the first amplifier input terminal and the amplifier output terminal, the capacitor $C_i$ and produces an integrated voltage which gradually rises from zero toward a positive voltage. The positive voltage is defined by the absolute value of the preselected voltage, namely, the voltage which is produced by the battery $B_1$.

The reference voltage supplying circuit 66 comprises a variable resistor $RV_1$ and a zener diode $ZD_1$ which has an anode connected to ground. The cathode of the zener diode $ZD_1$ is connected to the amplifier output terminal of the operational amplifier $OP_1$ through a resistor $R_0$. The variable resistor $RV_1$ has first and second resistor terminals and an intermediate tap. The first and the second resistor terminals, and the intermediate tap are connected to the cathode of the zener diode ground and the error amplifier 61, respectively.

With this structure, the first resistor terminal of the variable resistor $RV_1$ is supplied with the integrated voltage through the resistor $R_0$ with the integrated voltage limited to a zener voltage which is determined by the zener diode $ZD_1$. Responsive to the integrated voltage, the variable resistor $RV_1$ which shapes, i.e., divides the integrated voltage into a divided voltage and delivers as the d.c. reference voltage, the divided voltage to the error amplifier 61 through the intermediate tap. The divided voltage gradually rises from zero to a maximum reference voltage equal to a value determined by the zener voltage and the variable resistance $RV_1$. The maximum reference voltage is substantially equivalent to the predetermined reference voltage of the d.c. reference voltage.

It is possible to vary the maximum value (namely, the predetermined reference voltage) of the d.c. reference or divided voltage by changing the location of the intermediate tap in the variable resistor $RV_1$. As a result, the reference voltage supplying circuit 66 is adaptable or adjustable when a variation of the load 23 (FIG. 5) results in a change of the load current. Therefore, the start controlling circuit 21 (FIG. 5) is capable of adapting the current generator 22 (FIG. 5) to a wide variety of loads without replacement of the reference voltage producing circuit 60 (FIG. 5).

I claim:

1. A start controlling circuit for delivering a start signal to a constant current generator to cause said constant current generator to supply an output current to a load through which a load current flows in response to said output current, said start controlling circuit including current detecting means for detecting said load current to produce a detection voltage corresponding to said load current, converting means for converting a control voltage variable from zero to a positive voltage into a first pulse sequence having a pulse repetition period which decreases in response to a rise in said control voltage, processing means responsive to said control voltage for processing said first pulse sequence into a second pulse sequence having a pulse width which increases in response to said rise, and means for supplying said second pulse sequence to said constant current generator as said start signal, said start controlling circuit comprising:

reference voltage producing means for producing a d.c. reference voltage gradually rising from zero to a predetermined reference voltage;

error amplifying means having a pair of input terminals connected to said detecting means and to said reference voltage producing means, for amplifying an error signal representing an error between said detection voltage and said d.c. reference voltage, to produce an amplified voltage; and means for directly supplying said amplified voltage to said converting means and to said processing means as said control voltage;

said reference voltage producing means comprising:

voltage generating means for generating a step voltage which substantially instantaneously rises from zero to a preselected voltage;

integrating means coupled to said voltage generating means for integrating said step voltage to produce an integrated voltage which gradually rises from zero toward said preselected voltage; and voltage shaping means coupled to said integrating means for shaping and limiting said integrated voltage to form said d.c. reference voltage, said voltage shaping means including means for varying said d.c. reference voltage when a variation of said load results in a change in said load current.

* * * * *